US011653310B2

(12) United States Patent
Guo

(10) Patent No.: US 11,653,310 B2
(45) Date of Patent: May 16, 2023

(54) METHOD AND APPARATUS FOR DETERMINING TRANSMIT POWER

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 54 days.

(21) Appl. No.: 17/470,965

(22) Filed: Sep. 9, 2021

(65) Prior Publication Data

US 2021/0410077 A1 Dec. 30, 2021

Related U.S. Application Data

(63) Continuation of application No. PCT/CN2020/108125, filed on Aug. 10, 2020.

(60) Provisional application No. 62/885,611, filed on Aug. 12, 2019.

(51) Int. Cl.
*H04W 52/14* (2009.01)
*H04L 27/26* (2006.01)
*H04L 5/00* (2006.01)
*H04W 52/24* (2009.01)
*H04W 52/36* (2009.01)

(52) U.S. Cl.
CPC ......... *H04W 52/146* (2013.01); *H04L 5/0051* (2013.01); *H04L 27/26025* (2021.01); *H04W 52/242* (2013.01); *H04W 52/367* (2013.01)

(58) Field of Classification Search
CPC ............. H04W 52/146; H04W 52/242; H04W 52/367; H04L 27/26025; H04L 5/0051
See application file for complete search history.

(56) References Cited

U.S. PATENT DOCUMENTS

2010/0246463 A1* 9/2010 Papasakellariou ...... H04L 27/18
370/311
2015/0124673 A1* 5/2015 Ouchi ................. H04W 52/362
370/311
2019/0261320 A1* 8/2019 Yu ......................... H04W 24/08
(Continued)

FOREIGN PATENT DOCUMENTS

CN 105393623 A 3/2016
CN 106572478 A 4/2017
(Continued)

OTHER PUBLICATIONS

E. -K. Hong, J. -Y. Baek and G. Kaddoum, "A study on channel estimation algorithm with sounding reference signal for TDD downlink scheduling," 2017 IEEE 28th Annual International Symposium on Personal, Indoor, and Mobile Radio Communications (PIMRC), 2017, pp. 1-6, doi: 10.1109/PIMRC.2017.8292249. (Year: 2017).*
(Continued)

*Primary Examiner* — Jasper Kwoh
(74) *Attorney, Agent, or Firm* — Perkins Coie LLP

(57) ABSTRACT

A method for determining a transmit power includes: determining, by UE, a transmit power of a Sounding Reference Signal (SRS) based on a downlink pathloss of at least one of a serving cell or one or more neighbor cells, wherein the SRS transmission is for positioning purpose.

3 Claims, 2 Drawing Sheets

(56) References Cited

U.S. PATENT DOCUMENTS

| | | | | |
|---|---|---|---|---|
| 2019/0349867 A1* | 11/2019 | MolavianJazi | ..... | H04W 52/242 |
| 2020/0052802 A1* | 2/2020 | Ryu | ..... | H04W 52/146 |
| 2020/0221405 A1* | 7/2020 | Zarifi | ..... | H04W 52/322 |
| 2020/0351129 A1* | 11/2020 | Kwak | ..... | H04W 72/0493 |
| 2021/0045062 A1* | 2/2021 | Ryu | ..... | H04W 24/10 |
| 2021/0352613 A1* | 11/2021 | Yoon | ..... | H04L 5/0048 |

FOREIGN PATENT DOCUMENTS

| | | |
|---|---|---|
| CN | 109495838 A | 3/2019 |
| WO | 2016117974 A1 | 7/2016 |

OTHER PUBLICATIONS

3GPP TSG RAN WG1 Meeting #92—R1-1801808—Athens, Greece, Feb. 26-Mar. 2, 2018—Huawei, HiSilicon, Remaining details for uplink power control with CA (6 pages).

3GPP TSG RAN WG1 Meeting #93—R1-1807820—Busan, Korea, May 21-25, 2018—Qualcomm Incorporated, Summary of remaining issues for overlapping UL transmissions (15 pages).

International Search Report dated Nov. 13, 2020 of PCT/CN2020/108125 (2 pages).

\* cited by examiner

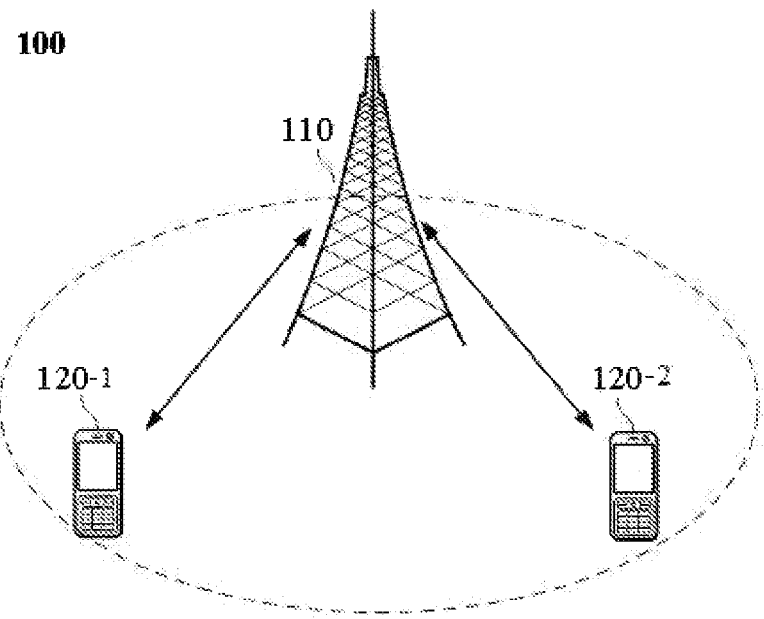
FIG. 1
UE determines a transmit power of an SRS transmission based on a pathloss of at least one of a serving cell or one or more neighbor cells, wherein the SRS transmission is for positioning purpose — 201
FIG. 2
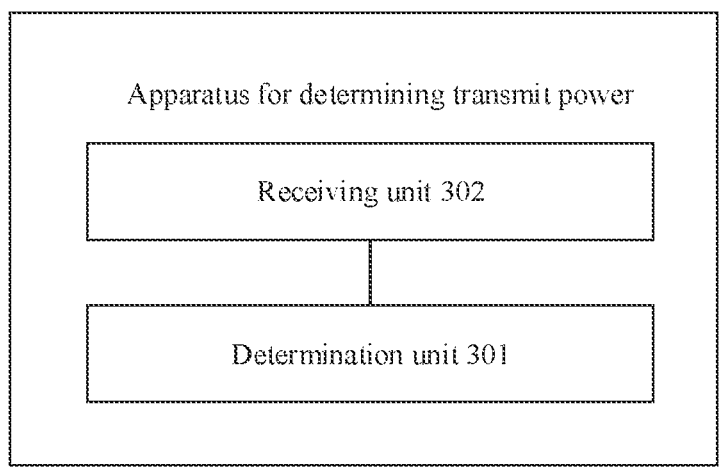
FIG. 3

METHOD AND APPARATUS FOR DETERMINING TRANSMIT POWER

CROSS-REFERENCE TO RELATED APPLICATIONS

This application is a continuation application of International Application No. PCT/CN2020/108125, filed on Aug. 10, 2020, which claims priority to U.S. Patent Application No. 62/885,611, filed on Aug. 12, 2019. The present application claims priority and the benefit of the above-identified applications and the above-identified applications are incorporated by reference herein in their entireties.

TECHNICAL FIELD

The present disclosure relates to the technical field of mobile communications, and particularly, to a method and apparatus for determining a transmit power, and User Equipment (UE).

BACKGROUND

The main shortcoming of the current power control method on SRS transmission is that it does consider the fact that the SRS for positioning purpose shall be received not only by the serving cell but also multiple neighbor cells. The hearability of transmission of SRS for positioning could be impaired and the transmission of SRS for positioning might not be received with good quality by some neighbor cell, thus the performance of UE positioning based on uplink signal measurement (for example uplink RTOA) is degraded.

SUMMARY

Implementations of the present disclosure relate to a method and apparatus for determining a transmit power, and User Equipment (UE).

Implementations of the disclosure provide a method for determining a transmit power, including:

determining, by User Equipment (UE), a transmit power of a Sounding Reference Signal (SRS) transmission based on a pathloss of at least one of a serving cell or one or more neighbor cells, wherein the SRS transmission is for positioning purpose.

Implementations of the disclosure provide an apparatus for determining a transmit power, applied in UE. The apparatus includes a determination unit.

The determination unit is configured to determine a transmit power of an SRS transmission based on a pathloss of at least one of a serving cell or one or more neighbor cells, wherein the SRS transmission is for positioning purpose.

Implementations of the disclosure provide User Equipment (UE), including a processor and a memory. The memory is configured to store a computer program. The processor is configured to invoke and run the computer program from memory to implement the method for determining a transmit power in the implementations of the disclosure.

Implementations of the disclosure provide a chip configured to implement the above mentioned method for determining a transmit power.

Specifically, the chip includes a processor configured to invoke and run a computer program stored in a memory to cause a device having the chip mounted thereon to perform the above mentioned method for determining a transmit power.

Implementations of the disclosure provide a computer-readable storage medium having stored thereon a computer program, wherein the computer program causes a computer to perform the above mentioned method for determining a transmit power.

Implementations of the disclosure provide a computer program product comprising computer program instructions, wherein the computer program instructions cause a processor to perform the above mentioned method for determining a transmit power.

Implementations of the disclosure provide a computer program that causes a computer to perform the above mentioned method for determining a transmit power.

According to the methods in disclosure, the fallback procedure of determining transmit power of an SRS transmission for positioning purpose can consider both pathloss of the serving cell and pathloss of neighbor cell(s) that are supposed to receive the SRS transmission. Thus, the hearability of SRS transmission during fallback procedure is guaranteed and positioning accuracy and reliability based on uplink measurement is improved.

BRIEF DESCRIPTION OF THE DRAWINGS

The accompanying drawings described herein are used to provide a further understanding of the present disclosure, and form a part of the present disclosure. Exemplary implementations of the present disclosure and descriptions thereof are used to explain the present disclosure, and do not constitute any inappropriate limitation to the present disclosure. In the accompanying drawings:

FIG. 1 is a schematic diagram showing an architecture of a communication system according to an implementation of the disclosure.

FIG. 2 is a schematic flow chart of a method for determining a transmit power according to an implementation of the disclosure.

FIG. 3 is a schematic structural diagram of an apparatus for determining a transmit power according to an implementation of the disclosure.

DETAILED DESCRIPTION

Figure 4:
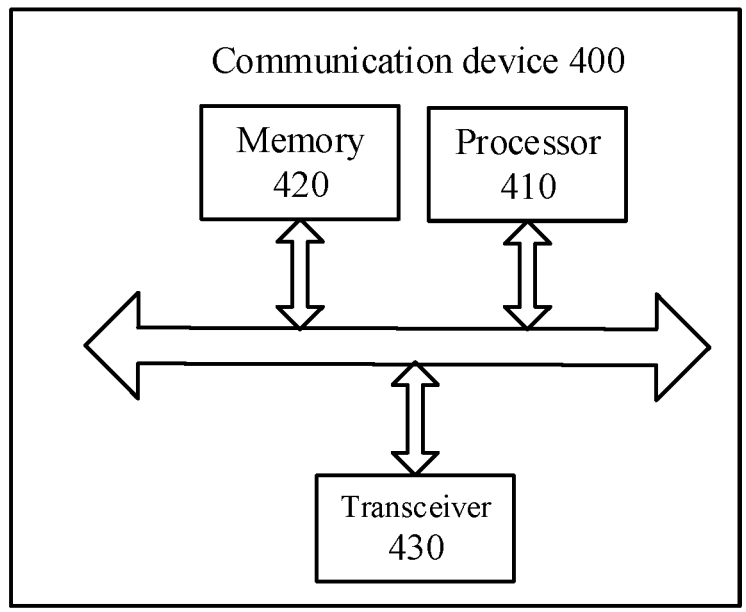
FIG. 4 is a schematic structural diagram of a communication device according to an implementation of the disclosure.

The technical solutions in the implementations of the disclosure will be described below in combination with the drawings in the implementations of the disclosure. It is apparent that the described implementations are not all implementations but part of implementations of the disclosure. All other implementations obtained by those of ordinary skill in the art based on the implementations in the disclosure without creative work shall fall within the scope of protection of the disclosure.

The technical solutions of the implementations of the disclosure may be applied to various communication systems, for example, a Global System of Mobile Communication (GSM), a Code Division Multiple Access (CDMA)

system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Exemplarily, the communication system 100 to which the implementations of the present disclosure is applied is illustrated in FIG. 1. The communication system 100 may include a network device 110, which may be a device communicating with a terminal (also referred to as a communication terminal, terminal). The network device 110 may provide communication coverage for a specific geographic area and may communicate with a terminal located within the coverage area. Alternatively, the network device 110 can be an Evolutional base station (Evolutional Node B, eNB or eNodeB) or a wireless controller in network in a cloud radio access network (CRAN) in an LTE system, or the network device can be mobile switching center, relay station, access point, on-board equipment, wearable equipment, hub, switch, bridge, router, network-side device in 5G network or network device in a future communication system, etc.

The communication system 100 also includes at least one terminal located within the coverage of the network device 110, for example, the at least one terminal includes terminal 120-1 and terminal 120-2. The "terminal" used herein includes but is not limited to the connection via wired lines, such as public switched telephone networks (PSTN) and digital subscriber lines Line, DSL, digital cable, direct cable connection; and/or another data connection/network; and/or via wireless interface, such as for cellular network, wireless local area network (WLAN), such as DVB-H Digital television network, satellite network, AM-FM broadcast transmitter of the network; and/or device set to receive/send communication signals of another terminal; and/or Internet of things (TOT) device. A terminal set to communicate via a wireless interface may be referred to as a "wireless communication terminal", "wireless terminal" or "mobile terminal". Examples of mobile terminals include, but are not limited to, satellites or cellular phones; personal communications systems that can combine cellular radiotelephony with data processing, fax, and data communication capabilities System (PCS) terminals; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

In at least one implementation, the terminal device may perform Device to Device (D2D) communication.

In at least one implementation, the 5G system or network may also be called an NR system or network.

FIG. 1 exemplarily shows one communication device and two terminals. Alternatively, the communication system 100 may include multiple network devices and each communication device may have another number of terminals in its coverage, which is not limited in the implementations of the disclosure.

Alternatively, the communication system 100 may further include other network entities such as a network controller, a mobility management entity and the like, which is not limited in the implementations of the disclosure.

It is to be noted that a device having a communication function in a network/system according to implementations of the disclosure can be referred to as a communication device. Taking the communication system 100 shown in FIG. 1 as an example, the communication device may include a network device 110 and a terminal that have a communication function. The network device 110 and the terminal may be the specific device described above, which will not elaborated herein. The communication device may further include other devices in the communication system 100, for example other network entities such as a network controller, a mobility management entity and the like, which is not limited in the implementations of the disclosure.

It is to be understood that terms "system" and "network" in the disclosure may usually be exchanged in the disclosure. In the disclosure, the term "and/or" is only an association relationship describing associated objects and represents that three relationships may exist. For example, A and/or B may represent three conditions: i.e., independent existence of A, existence of both A and B and independent existence of B. In addition, the character "I" in the disclosure usually represents that previous and next associated objects form an "or" relationship.

For better understanding of the technical solutions disclosed in the implementations of the disclosure, the technical solutions according to implementations of the disclosure are elaborated below.

In 5G NR, uplink power control on SRS transmission is supported. The power control on SRS transmission specified in release 15 is based on the method of fractional power control and the pathloss between the UE and the serving gNB. In current design, one UE can be configured with one or more SRS resource set and each SRS resource set can be configured with K≥1 SRS resources. Uplink power control parameters are configured per SRS resource set. One SRS rescore set $q_s$ is configured the following power control parameters:

$\alpha(q_s)$: pathloss compensation factor configured for the SRS resource set $q_s$.

$P_O(q_s)$: open-loop receive power target configured for the SRS resource set $q_s$.

$q_d$: pathloss reference signal, it is one index of a CSI-RS resource or SS/PBCH block transmitted by the serving gNB configured for the SRS resource set $q_s$.

srs-PowerControlAdjustmentStates to indicate whether same power control adjustment state for SRS and PUSCH transmission or separate power control adjustment shall be used for the SRS resource set.

The UE measures the CSI-RS resource or SS/PBCH block configured as pathloss reference signal to calculate the pathloss between the UE and the serving gNB. Then the UE calculates the transmit power for transmission in an SRS resource in the set $q_s$ as:

$$P_{SRS,b,f,c}(i, q_s, l) = \min \begin{Bmatrix} P_{CMAX,f,c}(i), \\ P_{O\_SRS,b,f,c}(q_s) + \\ 10\log_{10}(2^\mu \cdot M_{SRS,b,f,c}(i)) + \\ \alpha_{SRS,b,f,c}(q_s) \cdot \\ PL_{b,f,c}(q_d) + h_{b,f,c}(i, l) \end{Bmatrix} \quad (1)$$

The downlink pathloss $PL_{b,f,c}(q_d)$ is calculated by the UE using RS resource index $q_d$ configured to the SRS resource set. The RS resources index $q_d$ is provided by higher layer parameter pathlossReferenceRS associated with the SRS resource set $q_s$ and is either an ssb-Index providing a SS/PBCH block index or a csi-RS-Index providing a CSI-RS resource index.

If the UE is not provided pathloss RS parameter pathlossReferenceRS, a fallback procedure is used to calculate the downlink pathloss used in uplink power control. The UE estimate downlink pathloss using a RS resource obtained from the SS/PBCH block the UE uses to obtain MIB.

In the specified method, both open-loop and close-loop power control are supported. Open-loop power control on SRS transmission is based on the pathloss between the UE and the serving gNB that is calculated based on measuring downlink RS $q_d$ configured to the SRS resource set. Close-loop power control (the parameter $h_{b,f,c}(i,1)$) is based on the power adjust command sent by the serving gNB. Separate close-loop power control for SRS is signaled through DCI format 2_3.

The main shortcoming of current power control method on SRS transmission is it does consider the fact of that the SRS for positioning purpose shall be received not only by the serving cell but also multiple neighbor cells. The hearability of transmission of SRS for positioning could be impaired and the transmission of SRS for positioning might not be received with good quality by some neighbor cell, thus the performance UE positioning based on uplink signal measurement (for example uplink RTOA) is degraded.

Specifically, the fallback procedure for uplink power control procedure for SRS specified only uses one SSB to estimate the downlink pathloss when pathloss RS is not configured, while the pathloss to a neighbor cell is not considered. But neighbor cell is more far from the UE than the serving gNB and thus the pathloss between neighbor cell and the UE is larger than that of the serving gNB. The transmit power of SRS transmission based on current method would be too small to reach the neighbor cell to be received properly. Positioning based on uplink RTOA method relies on measuring SRS transmission from one UE by multiple cells, including the serving cell and multiple neighbor cells. The current method impairs the hearability of SRS positioning at the side of neighbor cells and reduce the number of neighbor cells that can detect the SRS transmission. The consequence is the performance of UE positioning service is impaired.

To this end, technical solutions according to implementations of the disclosure are proposed as follows. In this disclosure, the methods for transmit power control for SRS transmission for positioning are presented.

It is to be noted that in the technical solutions of the implementations of the disclosure, the term "downlink pathloss" can also be referred to as "pathloss", thus description made with respect to "downlink pathloss" and "pathloss" can be replaced with one another.

It is to be noted that in the technical solutions of the implementations of the disclosure, the term "downlink RS resource index" can also be referred to as "RS resource index", thus description made with respect to "downlink RS resource index" and "RS resource index" can be replaced with one another.

FIG. 2 is a schematic flow chart of a method for determining a transmit power according to an implementation of the disclosure. As illustrated in FIG. 2, the method for determining a transmit power includes an operation 201.

In operation 201, UE determines a transmit power of a Sounding Reference Signal (SRS) transmission based on a pathloss of at least one of a serving cell or one or more neighbor cells, wherein the SRS transmission is for positioning purpose.

For different cases, how the UE determines the transmit power of the SRS transmission is elaborated as follows.

Case 1

In a possible implementation, a UE can be configured with an SRS resource set for positioning purpose, $q_s$, and in the SRS resource set, the UE is configured with k≥1 SRS resources for positioning purpose. For the SRS resource set, the UE can be provided with one or more of the following uplink power parameters:

parameters associated with the serving cell: $P_{0,s}$ that is a target receive power level, $\alpha_s$ that is a downlink pathloss compensation factor and $RS_s$ that is a RS resource index indicating one SS/PBCH block or a CSI-RS resource that the UE uses to estimate downlink pathloss for the serving cell.

Parameters associated with neighbor cells for positioning purpose: $P_{0,n}$ that is a target receive power level, $\alpha_n$ that is a downlink pathloss compensation factor. And one or more downlink RS resource indices of neighbor cells that the UE uses to estimate downlink pathloss for one or more neighbor cells for positioning purpose. For example the UE is provided with two downlink RS resource indices of neighbor cells: a first downlink RS index $RS_{n1}$ and a second downlink RS index $RS_{n2}$, which can be two downlink RS resources of two neighbor cells.

In one method, the UE determines the SRS transmission power $P_{SRS,positiong}$ for a SRS resource in the SRS resource set $q_s$ as follows:

$$P_{SRS,positiong} = \min \begin{Bmatrix} P_{CMAX} \\ \max \begin{Bmatrix} P_{0,s} + 10\log_{10}(2^\mu \cdot M_{SRS}) + \\ \alpha_s \cdot PL_s + h \\ P_{0,n} + 10\log_{10}(2^\mu \cdot M_{SRS}) + \\ \alpha_n \cdot \max\{PL_{n1}, PL_{n2}\} \end{Bmatrix} \end{Bmatrix} \quad (2)$$

where:

$P_{CMAX}$ is the UE configured maximum output power;

$M_{SRS}$ is the SRS bandwidth expressed in number of resource blocks for the SRS transmission in the SRS resource. μ is the SCS (subcarrier spacing) configuration.

$PL_s$ is downlink pathloss calculated by the UE using RS resource index $RS_s$, i.e., the downlink pathloss of the serving cell.

$PL_{n1}$ is downlink pathloss calculated by the UE using RS resource index $RS_{n1}$, i.e., the downlink pathloss of a first neighbor cell.

$PL_{n2}$ is downlink pathloss calculated by the UE using RS resource index $RS_{n2}$, i.e., the downlink pathloss of a second neighbor cell.

h is the close-power control parameter for SRS transmission for positioning, which can be updated by the close-loop power command sent by the serving cell.

Case 2

In a possible implementation, in response to that a pathloss reference signal (RS) is not configured, the UE determines the transmit power of the SRS transmission based on a first transmit power and a first power offset, where the first transmit power is determined based on the pathloss of the serving cell, the pathloss of the serving cell being determined based on a first Synchronization Signal/PBCH Block (SSB) of the serving cell. Specifically, the UE determines the transmit power $P_{SRS,positioning}$ of the SRS transmission as $P_{SRS,positioning}=P_{SRS}+\vartheta$ where $P_{SRS}$ is a first transmit power, and $\vartheta$ is a first power offset.

In the above technical solution, the fact that the pathloss RS is not configured refers to a fact that an RS resource index for calculating the downlink pathloss is not configured. For example, both an RS resource index for calculating the downlink pathloss of the serving cell and an RS resource index for calculating the downlink pathloss of the neighbor cell(s) are not configured.

During its specific implementation, if the UE is not provided with downlink RS resource index for estimating downlink pathloss that is used in determining transmit power for SRS transmission for position purpose, the UE can perform the following operations.

1) One SS/PBCH block (i. e., the first SSB) of the serving cell is used to estimate the downlink pathloss. In a possible implementation, the SS/PBCH block can be the one that the UE measures the largest RSRP. In another possible implementation, the SS/PBCH block can be the one that the UE uses to obtain the MIB.

2) The UE uses the downlink pathloss calculated from the selected SS/PBCH block of the serving cell to calculate one transmit power $P_{SRS}$ and the UE can determine the transmit power for a SRS transmission for positioning purpose as $P_{SRS,positioning}=P_{SRS}+\vartheta$ where $\vartheta$ is a power offset. The examples of $\vartheta$ can be 3, 4, 6 or 8 dB.

In an example, the UE receives first configuration information from a network device (e.g., a base station), the first configuration information being used for determining configuration information of an SRS resource set for positioning purpose, the SRS resource set including one or more SRS resources for positioning purpose; in response to that an RS resource index for calculating a downlink pathloss is not configured in the first configuration information, the UE determines the transmit power $P_{SRS,positiong}$ of the SRS transmission in an SRS resource of the SRS resource set as:

$$P_{SRS,positiong} = \min\left\{ \begin{array}{c} P_{CMAX} \\ P_{0,s} + 10\log_{10}(2^\mu \cdot M_{SRS}) + \\ \alpha_s \cdot PL_s + \partial + h \end{array} \right\} \quad (3\text{-}1)$$

where $P_{CMAX}$ is a UE configured maximum output power; $P_{0,s}$ is a target receive power level configured for the serving cell; $M_{SRS}$ is an SRS bandwidth corresponding to the SRS resource; $\mu$ is a subcarrier spacing (SCS) corresponding to the SRS resource; $PL_s$ is the downlink pathloss of the serving cell, $PL_s$ being determined based on an RS resource obtained from the first SSB of the serving cell; $\alpha_s$ is a downlink pathloss compensation factor of the serving cell; $\vartheta$ is the first power offset; and h is a close-loop power control parameter.

In the above solution, the first SSB is an SSB for which the UE has a highest signal quality measurement; or the first SSB is an SSB that the UE uses to obtain a Master Information Block (MIB).

In another example, a UE is configured with an SRS resource set for positioning purpose, $q_s$, and in the SRS resource set $q_s$, the UE is configured with k≥1 SRS resources for positioning purpose. If the UE is not provided RS resource index for calculating downlink pathloss for the SRS resource set $q_s$, the UE can determine transmit power for an SRS transmission in SRS resource in the SRS resource set $q_s$ as:

$$P_{SRS,positiong} = \min\left\{ \begin{array}{c} P_{CMAX} \\ P_{0,s} + 10\log_{10}(2^\mu \cdot M_{SRS}) + \\ \alpha_s \cdot PL_s + \partial + h \end{array} \right\} \quad (3\text{-}2)$$

Where:

$PL_s$ is downlink pathloss the UE calculates by using a RS resource obtained from the SS/PBCH block that the UE uses to obtain MIB.

$\vartheta$ is power offset in dB. Examples of the value of $\vartheta$ can be 3, 4, 6 or 8 dB. That can be preconfigured or predefined. That can be configured by the gNB.

Other parameters can be explained as above with respect to equation (3-1).

The purpose for adding a positive power offset $\vartheta$ in the calculation of transmit power for SRS transmission for positioning purpose is to compensate the pathloss of neighbor cells, which is generally greater than that of the serving cell. When pathloss RS resource is not configured, the UE can only use one SS/PBCH block of the serving cell to estimate the downlink pathloss. The transmit power calculated based on such a downlink pathloss does not consider that fact. Therefore, a power offset is needed here.

Case 3

In a possible implementation, in response to that a pathloss RS for the serving cell is configured and the pathloss RS for the one or more neighbor cells is not configured, the UE determines the transmit power of the SRS transmission based on a second transmit power and a second power offset, wherein the second transmit power is determined based on the pathloss of the serving cell, the pathloss of the serving cell being determined based on the pathloss RS configured for the serving cell. Specifically, the UE determines the transmit power $P_{SRS,positioning}$ of the SRS transmissionas $P_{SRS,positioning}=P_{SRS}+\vartheta$, where $P_{SRS}$ is the second transmit power, and $\vartheta$ is the second power offset.

In the above technical solution, the fact that the pathloss RS for the serving cell is configured refers to a fact that an RS resource index for calculating the downlink pathloss of the serving cell is configured. The fact that the pathloss RS for the one or more neighbor cells is not configured refers to a fact that an RS resource index for calculating the downlink pathloss of the one or more neighbor cells is not configured.

During its specific implementation, if, for a SRS resource set for positioning purpose, the UE is provided with downlink RS resource index for estimating downlink pathloss of the serving cell but is not provided with downlink RS resource index for estimating downlink pathloss for neighbor cells, the UE can perform the following operations.

1) The downlink RS resource index configured for estimating pathloss of the serving cell is used to estimate the downlink pathloss.

2) The UE uses the downlink pathloss calculated from the configured downlink RS resource index of the serving cell to calculate one transmit power $P_{SRS}$ and the UE can determine the transmit power for a SRS transmission for positioning purpose as $P_{SRS,positiong}=P_{SRS}+\vartheta$, where $\vartheta$ is a power offset value. The examples of $\vartheta$ can be 3, 4, 6 or 8 dB.

In an example, the UE receives first configuration information from a network device (e.g., a base station), the first configuration information being used for determining configuration information of one SRS resource set for positioning purpose, the SRS resource set including one or more SRS resources for positioning purpose; in response to that an RS resource index for calculating the downlink pathloss of the serving cell is configured and an RS resource index for calculating the downlink pathloss of the neighbor cells is not configured in the first configuration information, the UE determines the transmit power $P_{SRS,positiong}$ of the SRS transmission in an SRS resource of the SRS resource set as:

$$P_{SRS,positiong} = \min\left\{ \begin{array}{c} P_{CMAX} \\ P_{0,s} + 10\log_{10}(2^\mu \cdot M_{SRS}) + \\ \alpha_s \cdot PL_s + \partial + h \end{array} \right\} \quad (3\text{-}3)$$

where $P_{CMAX}$ is a UE configured maximum output power; $P_{0,s}$ is a target receive power level configured for the serving cell; $M_{SRS}$ is an SRS bandwidth corresponding to the SRS resource; $\mu$ is a subcarrier spacing (SCS) corresponding to the SRS resource; $PL_s$ is the downlink pathloss of the serving cell, $PL_s$ being determined based on an RS resource index for calculating the downlink pathloss of the serving cell; $\alpha_s$ is a downlink pathloss compensation factor of the serving cell; $\vartheta$ is the first power offset; and h is a close-loop power control parameter.

In another example, a UE is configured with an SRS resource set for positioning purpose, $q_s$, and in the SRS resource set $q_s$, the UE is configured with k≥1 SRS resources for positioning purpose. If, in the configuration information of the SRS resource set $q_s$, the UE is provided with downlink RS resource index $RS_s$ for calculating downlink pathloss of the serving cell but is not provided RS resource index for calculating downlink pathloss of neighbor cell, the UE can determine transmit power for an SRS transmission in SRS resource in the SRS resource set $q_s$ as:

$$P_{SRS,positiong} = \min\left\{ \begin{array}{c} P_{CMAX} \\ P_{0,s} + 10\log_{10}(2^\mu \cdot M_{SRS}) + \\ \alpha_s \cdot PL_s + \partial + h \end{array} \right\} \quad (3\text{-}4)$$

Where:
  $PL_s$ is downlink pathloss the UE calculates by using RS resource index $RS_s$ provided by higher layer parameter in the configuration of SRS resource set $q_s$.
  $\vartheta$ is power offset in dB. Examples of the value of $\vartheta$ can be 3, 4, 6 or 8 dB. That can be preconfigured or predefined. That can be configured by the gNB.

Other parameters can be explained as above with respect to equation (3-3).

Similarly, to the case 2, the purpose for adding a positive power offset $\vartheta$ in the calculation of transmit power for SRS transmission for positioning purpose is to compensate the pathloss of neighbor cells, which is generally greater than that of the serving cell. The UE only uses RS resource index $RS_s$ of the serving cell to estimate the downlink pathloss.

The transmit power calculated based on such a downlink pathloss does not consider that fact. Therefore, a power offset is needed here.

Case 4

In a possible implementation, in response to that a pathloss RS for the serving cell is not configured and a pathloss RS for the one or more neighbor cells is configured, the UE determines the transmit power of the SRS transmission based on a third transmit power, wherein the third transmit power is determined based on the pathloss of the one or more neighbor cells and the pathloss of the serving cell, the pathloss of the one or more neighbor cells being determined based on the pathloss RS configured for the one or more neighbor cells, and the pathloss of the serving cell being determined based on a first SSB of the serving cell.

In the above technical solution, the fact that the pathloss RS for the serving cell is not configured refers to a fact that an RS resource index used for calculating the downlink pathloss of the serving cell is not configured. The fact that the pathloss RS for the one or more neighbor cells is configured refers to that an RS resource index used for calculating the downlink pathloss of the one or more neighbor cells is configured.

During specific implementation, if, for a SRS resource set for positioning purpose, the UE is not provided with downlink RS resource index for estimating downlink pathloss of the serving cell but is provided with downlink RS resource index for estimating downlink pathloss for neighbor cells, the UE can perform the following operations.

1) One SS/PBCH block of the serving cell is used to estimate the downlink pathloss. The SS/PBCH block can be the one that the UE measures the largest RSRP. The SS/PBCH block can be the one that the UE uses to obtain the MIB.

2) The UE uses the downlink pathloss calculated from the selected SS/PBCH block of the serving cell.

3) The configured downlink RS resource index for neighbor cells is used to calculate downlink pathloss of corresponding neighbor cells.

4) The UE can calculate one transmit power $P_{SRS}$ based on downlink pathloss estimated from the selected SS/PBCH block of the serving cell and downlink pathloss of neighbor cells.

In an example, the UE receives first configuration information from a network device (e.g., a base station), the first configuration information being used for determining configuration information of one SRS resource set for positioning purpose, the SRS resource set including one or more SRS resources for positioning purpose; in response to that an RS resource index for calculating the downlink pathloss of the serving cell is not configured and an RS resource index for calculating the downlink pathloss of the one or more neighbor cells is configured in the first configuration information, the UE determines the transmit power $P_{SRS,positiong}$ of the SRS transmission in an SRS resource of the SRS resource set as:

$$P_{SRS,positiong} = \min\left\{ \begin{array}{c} P_{CMAX} \\ \max\left\{ \begin{array}{c} P_{0,s} + 10\log_{10}(2^\mu \cdot M_{SRS}) + \\ \alpha_s \cdot PL_s + h \\ P_{0,n} + 10\log_{10}(2^\mu \cdot M_{SRS}) + \\ \alpha_n \cdot \max\{PL_{n1}, PL_{n2}\} \end{array} \right\} \end{array} \right\} \quad (4\text{-}1)$$

where $P_{CMAX}$ is a UE configured maximum output power; $P_{0,s}$ is a target receive power level configured for the serving cell; $M_{SRS}$ is an SRS bandwidth expressed in number of resource blocks; μ is an SCS; $PL_s$ is the downlink pathloss of the serving cell, $PL_s$ being determined based on an RS resource obtained from the first SSB of the serving cell; $α_s$ is a downlink pathloss compensation factor configured for the serving cell; h is a close-loop power control parameter; $P_{0,n}$ is a target receive power level configured for the one or more neighbor cells; $PL_{n1}$ is a first pathloss of the one or more neighbor cells, $PL_{n1}$ being determined based on a first RS resource index for calculating the downlink pathloss of the one or more neighbor cells; $PL_{n2}$ is a second pathloss of the one or more neighbor cells, $PL_{n2}$ being determined based on a second RS resource index for calculating the downlink pathloss of the one or more neighbor cells; and $α_n$ is a downlink pathloss compensation factor configured for the one or more neighbor cells.

In the above solution, the first SSB is an SSB for which the UE has a highest signal quality measurement; or the first SSB is an SSB that the UE uses to obtain a Master Information Block (MIB).

In another example, a UE is configured with an SRS resource set for positioning purpose, $q_s$, and in the SRS resource set $q_s$, the UE is configured with k≥1 SRS resources for positioning purpose. If the UE is not provided RS resource index for calculating downlink pathloss of the serving cell for the SRS resource set $q_s$, and if the UE is provided with RS resource index for calculating downlink pathloss of the neighbor cells: a first downlink RS index $RS_{n1}$ and a second downlink RS index $RS_{n2}$, the UE can determine transmit power for an SRS transmission in SRS resource in the SRS resource set $q_s$ as:

$$P_{SRS,positiong} = \min\left\{\max\left\{\begin{array}{l}P_{CMAX}\\P_{0,s} + 10\log_{10}(2^\mu \cdot M_{SRS}) + α_s \cdot PL_s + h\\P_{0,n} + 10\log_{10}(2^\mu \cdot M_{SRS}) + α_n \cdot \max\{PL_{n1}, PL_{n2}\}\end{array}\right\}\right\} \quad (4\text{-}2)$$

Where:
$PL_s$ is downlink pathloss the UE calculates by using a RS resource obtained from the SS/PBCH block that the UE uses to obtain MIB.
$PL_{n,1}$ is downlink pathloss the UE calculates by using RS resource index $RS_{n1}$
$PL_{n,2}$ is downlink pathloss the UE calculates by using RS resource index $RS_{n2}$
Other parameters can be explained as above with respect to equation (4-1).

Case 5

In a possible implementation, in response to that a pathloss RS for the one or more neighbor cells is not configured and a downlink Positioning Reference Signal (PRS) resource set for at least one neighbor cell is configured, the UE determines the transmit power of the SRS transmission based on the pathloss of the serving cell and the pathloss of the one or more neighbor cells, the pathloss of the one or more neighbor cells being determined based on a first downlink PRS resource of a first neighbor cell.

In the above technical solution, the fact that the pathloss RS for the one or more neighbor cells is not configured refers to a fact that an RS resource index used for calculating the downlink pathloss of the neighbor cells is not configured. In this case, the pathloss of the one or more neighbor cells is determined based on a first downlink PRS resource of a first neighbor cell.

During specific implementation, if, for a SRS resource set for positioning purpose, the UE is not provided with downlink RS resource index for estimating downlink pathloss for neighbor cells and the UE is configured downlink PRS of neighbor cell(s) for downlink positioning measurement, the UE can perform the following operations.

1) One downlink PRS resource of one neighbor cell configured for downlink positioning measurement is used to estimate the downlink pathloss of neighbor cell for determining the transmit power of an SRS transmission for positioning purpose. The selected neighbor cell can be the neighbor cell configured with highest priority for downlink measurement for positioning purpose. The downlink PRS resource can be the one that the UE measures the highest RSRP.

2) Then the UE uses the downlink pathloss calculated from the selected downlink PRS resource of the selected neighbor cell and downlink pathloss calculated from one downlink RS of the serving cell to determine the transmit power of an SRS transmission in the SRS resource set for positioning purpose.

In the above technical solution, the pathloss of the serving cell can be determined through two manner.

In manner 1, in response to that a pathloss RS for the serving cell is not configured, the pathloss of the serving cell is determined based on a first SSB of the serving cell.

Herein, the fact that the pathloss RS for the serving cell is not configured refers to a fact that an RS resource index used for calculating the downlink pathloss of the serving cell is not configured.

In an example, the UE receives first configuration information and second configuration information from a network device, wherein the first configuration information is used for determining configuration information of an SRS resource set for positioning purpose, the SRS resource set including one or more SRS resources for positioning purpose; and the second configuration information is used for determining configuration information of a downlink PRS resource set of at least one neighbor cell, the downlink PRS resource set including one or more PRS resources for positioning purpose; in response to that an RS resource index for calculating the downlink pathloss of the serving cell is not configured and an RS resource index for calculating the downlink pathloss of the one or more neighbor cells is not configured in the first configuration information, the UE determines the transmit power $P_{SRS,positiong}$ of the SRS transmission in an SRS resource of the SRS resource set as:

$$P_{SRS,positiong} = \min\left\{\max\left\{\begin{array}{l}P_{CMAX}\\P_{0,s} + 10\log_{10}(2^\mu \cdot M_{SRS}) + α_s \cdot PL_s + h\\P_{0,n} + 10\log_{10}(2^\mu \cdot M_{SRS}) + α_n \cdot PL_n\end{array}\right\}\right\} \quad (5\text{-}1)$$

where $P_{CMAX}$ is a UE configured maximum output power; $P_{0,s}$ is a target receive power level configured for the serving cell; $M_{SRS}$ is an SRS bandwidth expressed in a number of resource blocks; μ is an SCS; $PL_s$ is the downlink pathloss of the serving cell, $PL_s$ being determined based on an RS resource obtained from the first SSB of the serving cell; $α_s$ is a downlink pathloss compensation factor configured for the serving cell; h is a close-loop power control parameter; $P_{0,n}$ is a target receive power level configured for the one or more neighbor cells; $PL_n$ is the downlink pathloss of the one or more neighbor cells, $PL_n$ being determined based on a first downlink PRS resource of a first neighbor cell; and $\alpha_n$ is a downlink pathloss compensation factor configured for the one or more neighbor cells.

Herein, the first SSB is an SSB for which the UE has a highest signal quality measurement; or the first SSB is an SSB that the UE uses to obtain a Master Information Block (MIB).

Herein, the first neighbor cell is a neighbor cell with a highest priority for measurement among the at least one neighbor cell, and the first downlink PRS resource is a downlink PRS resource for which the UE has a highest signal quality measurement.

In another example, a UE is configured with an SRS resource set for positioning purpose, $q_s$, and in the SRS resource set $q_s$, the UE is configured with k≥1 SRS resources for positioning purpose. If the UE is NOT provided RS resource index for calculating downlink pathloss of the serving cell for the SRS resource set $q_s$, and if the UE is NOT provided with RS resource index for calculating downlink pathloss of the neighbor cells. The UE is provided, by the location server, with a list of neighbor cells for downlink measurement for positioning purpose and for each neighbor cell provided to the UE, the UE is provided with a downlink PRS resource set with m≥1 downlink PRS resources. Then the UE can determine transmit power for an SRS transmission in SRS resource in the SRS resource set $q_s$ as:

$$P_{SRS,positiong} = \min\left\{ \begin{array}{l} P_{CMAX} \\ \max\left\{ \begin{array}{l} P_{0,s} + 10\log_{10}(2^\mu \cdot M_{SRS}) + \alpha_s \cdot PL_s + h \\ P_{0,n} + 10\log_{10}(2^\mu \cdot M_{SRS}) + \alpha_n \cdot PL_n \end{array} \right\} \end{array} \right\} \quad (5\text{-}2)$$

Where:
$PL_s$ is downlink pathloss the UE calculates by using a RS resource obtained from the SS/PBCH block that the UE uses to obtain MIB.
$PL_n$ is downlink pathloss the UE calculates by using one selected downlink PRS resource of one neighbor cell selected from the list of neighbor cells provided for downlink positioning measurement. The selected neighbor cell can be the one configured with highest priority for downlink positioning measurement. The selected downlink PRS resource of the selected neighbor cell can be the PRS resource with highest RSRP measurement.

Other parameters can be explained as above with respect to equation (5-1).

In manner 2, in response to that a pathloss RS for the serving cell is configured, the pathloss of the serving cell is determined based on the pathloss RS configured for the serving cell.

Herein, the fact that the pathloss RS for the serving cell is configured refers to a fact that an RS resource index used for calculating the downlink pathloss of the serving cell is configured.

The UE receives first configuration information and second configuration information from a network device, wherein the first configuration information is used for determining configuration information of an SRS resource set for positioning purpose, the SRS resource set including one or more SRS resources for positioning purpose; and the second configuration information is used for determining configuration information of a downlink PRS resource set of at least one neighbor cell, the downlink PRS resource set including one or more PRS resources for positioning purpose; in response to that an RS resource index for calculating the downlink pathloss of the serving cell is configured and an RS resource index for calculating the downlink pathloss of the neighbor cells is not configured in the first configuration information, the UE determines the transmit power $P_{SRS,positiong}$ of the SRS transmission in an SRS resource of the SRS resource set as:

$$P_{SRS,positiong} = \min\left\{ \begin{array}{l} P_{CMAX} \\ \max\left\{ \begin{array}{l} P_{0,s} + 10\log_{10}(2^\mu \cdot M_{SRS}) + \alpha_s \cdot PL_s + h \\ P_{0,n} + 10\log_{10}(2^\mu \cdot M_{SRS}) + \alpha_n \cdot PL_n \end{array} \right\} \end{array} \right\} \quad (5\text{-}3)$$

where $P_{CMAX}$ is a UE configured maximum output power; $P_{0,s}$ is a target receive power level configured for the serving cell; $M_{SRS}$ is an SRS bandwidth expressed in a number of resource blocks; $\mu$ is an SCS; $PL_s$ is a downlink pathloss of the serving cell, $PL_s$ being determined based on an RS resource index for calculating the downlink pathloss of the serving cell; $\alpha_s$ is a downlink pathloss compensation factor configured for the serving cell; h is a close-loop power control parameter; $P_{0,n}$ is a target receive power level configured for the one or more neighbor cells; $PL_n$ is a downlink pathloss of the one or more neighbor cells, $PL_n$ being determined based on a first downlink PRS of a first neighbor cell; and $\alpha_n$ is a downlink pathloss compensation factor configured for the one or more neighbor cells.

Herein, the first neighbor cell is a neighbor cell with a highest priority for measurement among the at least one neighbor cell, and the first downlink PRS resource is a downlink PRS resource for which the UE has a highest signal quality measurement.

In another example, a UE is configured with an SRS resource set for positioning purpose, $q_s$, and in the SRS resource set $q_s$, the UE is configured with k≥1 SRS resources for positioning purpose. If the UE is provided RS resource index, $RS_s$, for calculating downlink pathloss of the serving cell for the SRS resource set $q_s$, and if the UE is NOT provided with RS resource index for calculating downlink pathloss of the neighbor cells. The UE is provided, by the location server, with a list of neighbor cells for downlink measurement for positioning purpose and for each neighbor cell provided to the UE, the UE is provided with a downlink PRS resource set with m≥1 downlink PRS resources. Then the UE can determine transmit power for an SRS transmission in SRS resource in the SRS resource set $q_s$ as:

$$P_{SRS,positiong} = \min\left\{ \begin{array}{l} P_{CMAX} \\ \max\left\{ \begin{array}{l} P_{0,s} + 10\log_{10}(2^\mu \cdot M_{SRS}) + \alpha_s \cdot PL_s + h \\ P_{0,n} + 10\log_{10}(2^\mu \cdot M_{SRS}) + \alpha_n \cdot PL_n \end{array} \right\} \end{array} \right\} \quad (5\text{-}4)$$

Where:
$PL_s$ is downlink pathloss the UE calculates by using the configured RS resource index $RS_s$ of the serving cell.
$PL_n$ is downlink pathloss the UE calculates by using one selected downlink PRS resource of one neighbor cell selected from the list of neighbor cells provided for downlink positioning measurement. The selected neighbor cell can be the one configured with highest priority for downlink positioning measurement. The selected downlink PRS resource of the selected neighbor cell can be the PRS resource with highest RSRP measurement.

Other parameters can be explained as above with respect to equation (5-3).

In the technical solutions of the disclosure, the methods of fallback uplink power control for SRS transmission for positioning purpose are presented.

For the case 2 in the above technical solutions, when pathloss RS for SRS for positioning is not provided, the UE calculates the transmit power for a SRS transmission=transmit power calculated based on downlink pathloss estimated from an SSB of the serving cell+a power offset, where the power offset is used to compensate the pathloss of neighbor cell. For the case 3 in the above technical solutions, if pathloss RS for serving cell is configured but pathloss RS for neighbor cell is not configured, the transmit power for a SRS transmission is equal to a transmit power calculated based on downlink pathloss estimated from the pathloss RS of the serving cell+a power offset. For the case 4 in the above technical solutions, if pathloss RS for the serving cell is not configured but pathloss RS for neighbor cell(s) is configured, the transmit power for a SRS transmission is equal to a transmit power calculated based on downlink pathloss estimated from the pathloss RS configured for the neighbor cell and a downlink pathloss estimated from one selected SSB of the serving cell. For the case 5 in the above technical solutions, if the UE is not configured with an pathloss RS for neighbor cell and if the UE is configured with downlink PRS resources of one or more neighbor cells for downlink positioning measurement, the UE can be requested to use one downlink PRS from the neighbor cell with highest priority for measurement as pathloss RS to calculate downlink pathloss of neighbor cell to calculating transmit power for SRS transmission for positioning purpose.

To implement the above method for determining a transmit power, implementations of the disclosure further provide an apparatus for determining a transmit power, applied in the UE side. As shown in FIG. 3, the apparatus for determining a transmit power includes a determination unit 301 and a receiving unit 302.

The determination unit 301 is configured to determine a transmit power of a Sounding Reference Signal (SRS) transmission based on a pathloss of at least one of a serving cell or one or more neighbor cells, wherein the SRS transmission is for positioning purpose.

In a possible implementation, the determination unit 301 is configured to: in response to that a pathloss reference signal (RS) is not configured, determine the transmit power of the SRS transmission based on a first transmit power and a first power offset, wherein the first transmit power is determined based on the pathloss of the serving cell, the pathloss of the serving cell being determined based on a first Synchronization Signal/PBCH Block (SSB) of the serving cell.

In a possible implementation, the determination unit 301 is configured to determine the transmit power $P_{SRS,positiong}$ of the SRS transmission as:

$$P_{SRS,positioning} = P_{SRS} + \vartheta$$

where $P_{SRS}$ is the first transmit power, and $\vartheta$ is the first power offset.

In a possible implementation, the apparatus further includes a receiving unit 302.

The receiving unit 302 is configured to receive first configuration information from a network device, the first configuration information being used for determining configuration information of an SRS resource set for positioning purpose, the SRS resource set including one or more SRS resources for positioning purpose.

Herein, the determination unit 301 is configured to: in response to that an RS resource index for calculating a downlink pathloss is not configured in the first configuration information, determine the transmit power $P_{SRS,positiong}$ of the SRS transmission in an SRS resource of the SRS resource set as:

$$P_{SRS,positiong} = \min\left\{ \begin{array}{c} P_{CMAX} \\ P_{0,s} + 10\log_{10}(2^{\mu} \cdot M_{SRS}) + \alpha_s \cdot PL_s + \vartheta + h \end{array} \right\}$$

where $P_{CMAX}$ is a UE configured maximum output power; $P_{0,s}$ is a target receive power level configured for the serving cell; $M_{SRS}$ is an SRS bandwidth corresponding to the SRS resource; $\mu$ is a subcarrier spacing (SCS) corresponding to the SRS resource; $PL_s$ is the downlink pathloss of the serving cell, $PL_s$ being determined based on an RS resource obtained from the first SSB of the serving cell; $\alpha_s$ is a downlink pathloss compensation factor of the serving cell; $\vartheta$ is the first power offset; and h is a close-loop power control parameter In a possible implementation, the determination unit 301 is configured to: in response to that a pathloss RS for the serving cell is configured and the pathloss RS for the one or more neighbor cells is not configured, determine the transmit power of the SRS transmission based on a second transmit power and a second power offset, wherein the second transmit power is determined based on the pathloss of the serving cell, the pathloss of the serving cell being determined based on the pathloss RS configured for the serving cell.

In a possible implementation, the determination unit 301 is configured to determine the transmit power $P_{SRS,positioning}$ of the SRS transmission as:

$$P_{SRS,positioning} = P_{SRS} + \vartheta$$

where $P_{SRS}$ is the second transmit power, and $\vartheta$ is the second power offset.

In a possible implementation, the apparatus further includes a receiving unit 302.

The receiving unit 302 is configured to receive first configuration information from a network device, the first configuration information being used for determining configuration information of an SRS resource set for positioning purpose, the SRS resource set including one or more SRS resources for positioning purpose.

Herein, the determination unit is configured to: in response to that an RS resource index for calculating the downlink pathloss of the serving cell is configured and an RS resource index for calculating the downlink pathloss of the neighbor cells is not configured in the first configuration information, determine the transmit power $P_{SRS,positiong}$ of the SRS transmission in an SRS resource of the SRS resource set as:

$$P_{SRS,positiong} = \min\left\{ \begin{array}{c} P_{CMAX} \\ P_{0,s} + 10\log_{10}(2^{\mu} \cdot M_{SRS}) + \alpha_s \cdot PL_s + \vartheta + h \end{array} \right\}$$

where $P_{CMAX}$ is a UE configured maximum output power; $P_{0,s}$ is a target receive power level configured for the serving cell; $M_{SRS}$ is an SRS bandwidth corresponding to the SRS resource; μ is a subcarrier spacing (SCS) corresponding to the SRS resource; $PL_s$ is the downlink pathloss of the serving cell, $PL_s$ being determined based on an RS resource index for calculating the downlink pathloss of the serving cell; $α_s$ is a downlink pathloss compensation factor of the serving cell; ϑ is the first power offset; and h is a close-loop power control parameter.

In a possible implementation, the determination unit 301 is configured to: in response to that a pathloss RS for the serving cell is not configured and a pathloss RS for the one or more neighbor cells is configured, determine the transmit power of the SRS transmission based on a third transmit power, wherein the third transmit power is determined based on the pathloss of the one or more neighbor cells and the pathloss of the serving cell, the pathloss of the one or more neighbor cells being determined based on the pathloss RS configured for the one or more neighbor cells, and the pathloss of the serving cell being determined based on a first SSB of the serving cell.

In a possible implementation, the apparatus further includes a receiving unit 302.

The receiving unit 302 is configured to receive first configuration information from a network device, the first configuration information being used for determining configuration information of an SRS resource set for positioning purpose, the SRS resource set including one or more SRS resources for positioning purpose.

Herein, the determination unit 301 is configured to: in response to that an RS resource index for calculating the downlink pathloss of the serving cell is not configured and an RS resource index for calculating the downlink pathloss of the one or more neighbor cells is configured in the first configuration information, determine the transmit power $P_{SRS,positiong}$ of the SRS transmission in an SRS resource of the SRS resource set as:

$$P_{SRS,positiong} = \min\left\{ \begin{array}{l} P_{CMAX} \\ \max\left\{ \begin{array}{l} P_{0,s} + 10\log_{10}(2^\mu \cdot M_{SRS}) + α_s \cdot PL_s + h \\ P_{0,n} + 10\log_{10}(2^\mu \cdot M_{SRS}) + α_n \cdot \max\{PL_{n1}, PL_{n2}\} \end{array} \right\} \end{array} \right\}$$

where $P_{CMAX}$ is a UE configured maximum output power; $P_{0,s}$ is a target receive power level configured for the serving cell; $M_{SRS}$ is an SRS bandwidth expressed in number of resource blocks; μ is an SCS; $PL_s$ is the downlink pathloss of the serving cell, $PL_s$ being determined based on an RS resource obtained from the first SSB of the serving cell; $α_s$ is a downlink pathloss compensation factor configured for the serving cell; h is a close-loop power control parameter; $P_{0,n}$ is a target receive power level configured for the one or more neighbor cells; $PL_{n1}$ is a first pathloss of the one or more neighbor cells, $PL_{n1}$ being determined based on a first RS resource index for calculating the downlink pathloss of the one or more neighbor cells; $PL_{n2}$ is a second pathloss of the one or more neighbor cells, $PL_{n2}$ being determined based on a second RS resource index for calculating the downlink pathloss of the one or more neighbor cells; and $α_n$ is a downlink pathloss compensation factor configured for the one or more neighbor cells.

In a possible implementation, the determination unit 301 is configured to: in response to that a pathloss RS for the one or more neighbor cells is not configured and a downlink Positioning Reference Signal (PRS) resource set for at least one neighbor cell is configured, determine the transmit power of the SRS transmission based on the pathloss of the serving cell and the pathloss of the one or more neighbor cells, the pathloss of the one or more neighbor cells being determined based on a first downlink PRS resource of a first neighbor cell.

In a possible implementation, in response to that a pathloss RS for the serving cell is not configured, the pathloss of the serving cell is determined based on a first SSB of the serving cell.

In a possible implementation, the apparatus further includes a receiving unit 302.

The receiving unit 302 is configured to receive first configuration information and second configuration information from a network device, wherein the first configuration information is used for determining configuration information of an SRS resource set for positioning purpose, the SRS resource set including one or more SRS resources for positioning purpose; and the second configuration information is used for determining configuration information of a downlink PRS resource set of at least one neighbor cell, the downlink PRS resource set including one or more PRS resources for positioning purpose.

Herein, the determination unit is configured to: in response to that an RS resource index for calculating the downlink pathloss of the serving cell is not configured and an RS resource index for calculating the downlink pathloss of the one or more neighbor cells is not configured in the first configuration information, determine the transmit power $P_{SRS,positiong}$ of the SRS transmission in an SRS resource of the SRS resource set as:

$$P_{SRS,positiong} = \min\left\{ \begin{array}{l} P_{CMAX} \\ \max\left\{ \begin{array}{l} P_{0,s} + 10\log_{10}(2^\mu \cdot M_{SRS}) + α_s \cdot PL_s + h \\ P_{0,n} + 10\log_{10}(2^\mu \cdot M_{SRS}) + α_n \cdot PL_n \end{array} \right\} \end{array} \right\}$$

where $P_{CMAX}$ is a UE configured maximum output power; $P_{0,s}$ is a target receive power level configured for the serving cell; $M_{SRS}$ is an SRS bandwidth expressed in a number of resource blocks; μ is an SCS; $PL_s$ is the downlink pathloss of the serving cell, $PL_s$ being determined based on an RS resource obtained from the first SSB of the serving cell; $α_s$ is a downlink pathloss compensation factor configured for the serving cell; h is a close-loop power control parameter; $P_{0,n}$ is a target receive power level configured for the one or more neighbor cells; $PL_n$ is the downlink pathloss of the one or more neighbor cells, $PL_n$ being determined based on a first downlink PRS resource of a first neighbor cell; and $α_n$ is a downlink pathloss compensation factor configured for the one or more neighbor cells.

In a possible implementation, in response to that a pathloss RS for the serving cell is configured, the pathloss of the serving cell is determined based on the pathloss RS configured for the serving cell.

In a possible implementation, the apparatus further includes a receiving unit 302.

The receiving unit 302 is configured to receive first configuration information and second configuration information from a network device, wherein the first configuration information is used for determining configuration information of an SRS resource set for positioning purpose, the SRS resource set including one or more SRS resources for positioning purpose; and the second configuration information is used for determining configuration information of a downlink PRS resource set of at least one neighbor cell, the downlink PRS resource set including one or more PRS resources for positioning purpose.

Herein, the determination unit is configured to: in response to that an RS resource index for calculating the downlink pathloss of the serving cell is configured and an RS resource index for calculating the downlink pathloss of the neighbor cells is not configured in the first configuration information, determine the transmit $P_{SRS,positiong}$ of the SRS transmission in an SRS resource of the SRS resource set as:

$$P_{SRS,positiong} = \min\left\{ \begin{array}{c} P_{CMAX} \\ \max\left\{ \begin{array}{c} P_{0,s} + 10\log_{10}(2^\mu \cdot M_{SRS}) + \alpha_s \cdot PL_s + h \\ P_{0,n} + 10\log_{10}(2^\mu \cdot M_{SRS}) + \alpha_n \cdot PL_n \end{array} \right\} \end{array} \right\}$$

where $P_{CMAX}$ is a UE configured maximum output power; $P_{0,s}$ is a target receive power level configured for the serving cell; $M_{SRS}$ is an SRS bandwidth expressed in a number of resource blocks; $\mu$ is an SCS; $PL_s$ is a downlink pathloss of the serving cell, $PL_s$ being determined based on an RS resource index for calculating the downlink pathloss of the serving cell; $\alpha_s$ is a downlink pathloss compensation factor configured for the serving cell; h is a close-loop power control parameter; $P_{0,n}$ is a target receive power level configured for the one or more neighbor cells; $PL_n$ is a downlink pathloss of the one or more neighbor cells, $PL_n$ being determined based on a first downlink PRS of a first neighbor cell; and $\alpha_n$ is a downlink pathloss compensation factor configured for the one or more neighbor cells.

In a possible implementation, the first neighbor cell is a neighbor cell with a highest priority for measurement among the at least one neighbor cell, and the first downlink PRS resource is a downlink PRS resource for which the UE has a highest signal quality measurement.

In a possible implementation, the first SSB is an SSB for which the UE has a highest signal quality measurement; or the first SSB is an SSB that the UE uses to obtain a Master Information Block (MIB).

It should be appreciated by those skilled in the art that the description of the apparatus for determining a transmit power according to implementations of the disclosure can be understood based on related description of the method for determining a transmit power according to implementations of the disclosure.

FIG. 4 is a schematic structural diagram of a communication device 400 provided in the implementations of the present disclosure. The communication device can be UE or network device. The communication device 400 illustrated in FIG. 4 includes processor 410, and processor 410 can call and run computer programs from memory to realize the method in the implementations of the present disclosure.

Optionally, as illustrated in FIG. 4, the communication device 400 may further include a memory 420. The processor 410 can invoke and run the computer program from memory 420 to implement the method in the implementations of the disclosure.

The memory 420 may be a separate device independent of or integrated into the processor 410.

Optionally, as illustrated in FIG. 4, the communication device 400 may also include a transceiver 430. The processor 410 may control the transceiver 430 to communicate with other devices, in particular, to send information or data to other devices, or receive information or data sent by other devices.

The transceiver 430 may include a transmitter and a receiver. The transceiver 430 may further include an antenna(s), the number of which may be one or more.

Optionally, the communication device 400 can be specifically a network device of the implementation of the present disclosure, and the communication device 400 can realize the corresponding process realized by the network device in each method of the implementations of the present disclosure. For the sake of simplicity, it will not be elaborated here.

Optionally, the communication device 400 can be a mobile terminal/UE according to the implementations of the present disclosure, and the communication device 400 can realize the corresponding flow realized by the mobile terminal/UE in the various methods of the implementations of the present disclosure. For the sake of brevity, it will not be described here.

Figure 5:
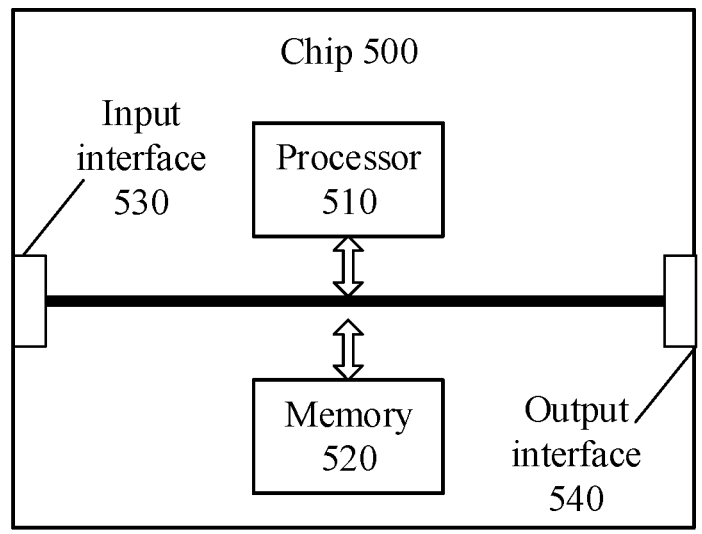
FIG. 5 is a schematic structural diagram of a chip according to an implementation of the disclosure.

FIG. 5 is a schematic structural diagram of a chip according to an implementation of the present disclosure. The chip 500 illustrated in FIG. 5 includes processor 510, and processor 510 can invoke and run computer programs from memory to implement the method in the implementations of the disclosure.

Optionally, as illustrated in FIG. 5, the chip 500 may also include a memory 520. The processor 510 can invoke and run the computer program from memory 520 to implement the method in the implementations of the disclosure.

The memory 520 may be a separate device independent of or integrated into the processor 510.

Optionally, the chip 500 may also include an input interface 530. The processor 510 can control the input interface 530 to communicate with other devices or chips, and in particular can obtain information or data sent by other devices or chips.

Optionally, the chip 500 may also include an output interface 540. The processor 510 may control the output interface 540 to communicate with other devices or chips, and in particular may output information or data to other devices or chips.

Optionally, the chip can be applied to the network device in the implementations of the present disclosure, and the chip can realize the corresponding process realized by the network device in each method of the implementations of the disclosure. For the sake of brevity, it will not be elaborated here.

Optionally, the chip can be applied to the mobile terminal/UE in the implementations of the present disclosure, and the chip can realize the corresponding flow realized by the mobile terminal/UE in each method of the implementation of the disclosure. For the sake of simplicity, it will not be described here.

It is to be understood that the chips mentioned in the implementations of the present disclosure can also be referred to as system level chips, system chips, chip systems or on-chip system chips, etc.

Figure 6:
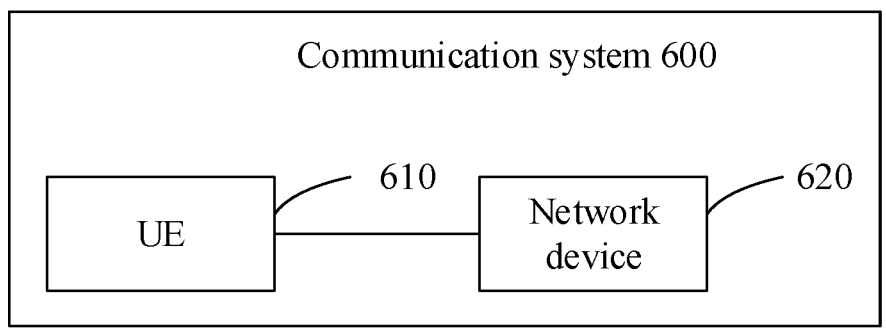
FIG. 6 is a schematic structural diagram of a communication system according to an implementation of the disclosure.

FIG. 6 is a schematic block diagram of a communication system 600 provided by an implementation of the present disclosure. As illustrated in FIG. 6, the communication system 600 includes UE 610 and a network device 620.

The UE 610 can be used to realize the corresponding functions realized by the UE in the above method, and the network device 620 can be used to realize the corresponding functions realized by the network device in the above method. For the sake of simplicity, it will not be elaborated here.

It is to be understood that the processor in the implementation of the disclosure may be an integrated circuit chip and has a signal processing capability. In an implementation process, each step of the method implementation may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the implementations of the disclosure may be implemented or executed. The universal processor may be a microprocessor or the processor may also be any conventional processor and the like. The steps of the method disclosed in combination with the implementations of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the implementation of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM).

It is to be noted that the memory of a system and method described in the disclosure is intended to include, but not limited to, memories of these and any other proper types.

It is to be understood that the above described memory is exemplary but not restrictive. For example, the memory in the implementation of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the implementations of the present disclosure is intended to include, but not limited to, these and any other suitable types of memory.

The implementations of the present disclosure also provide a computer-readable storage medium for storing computer programs.

Optionally, the computer-readable storage medium can be applied to the network device in the implementation of the present disclosure, and the computer program enables the computer to execute the corresponding processes implemented by the network device in the various methods of the implementation of the present disclosure. For the sake of brevity, it will not be repeated here.

Optionally, the computer-readable storage medium can be applied to the mobile terminal/UE in the implementation of the present disclosure, and the computer program enables the computer to execute the corresponding processes implemented by the mobile terminal/UE in the various methods of the implementation of the present disclosure. For the sake of brevity, it will not be repeated here.

The implementation of the present disclosure also provides a computer program product, including a computer program instruction.

Optionally, the computer program product can be applied to the network device in the implementations of the present disclosure, and the computer program instruction enables the computer to execute the corresponding processes implemented by the network device in the various methods of the implementation of the disclosure. For the sake of brevity, it will not be repeated here.

Optionally, the computer program product can be applied to the mobile terminal/UE in the implementations of the present disclosure, and the computer program instruction enables the computer to execute the corresponding process implemented by the mobile terminal/UE in the various methods of the implementation of the disclosure, for the sake of brevity, it will not be repeated here.

The implementation of the present disclosure also provides a computer program.

Optionally, the computer program can be applied to the network device in the implementations of the present disclosure. When the computer program runs on the computer, the computer executes the corresponding process realized by the network device in each method of the implementation of the disclosure. For the sake of brevity, it will not be described here.

Optionally, the computer program can be applied to the mobile terminal/UE in the implementations of the present disclosure. When the computer program runs on the computer, the computer executes the corresponding process realized by the mobile terminal/UE in the various methods of the implementation of the disclosure. For the sake of brevity, it will not be elaborated here.

Those of ordinary skill in the art may realize that the units and algorithm steps of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method implementation and will not be elaborated herein for convenient and brief description In some implementations provided by the disclosure, it is to be understood that the disclosed system, device and method may be implemented in another manner. For example, the device implementation described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the implementations according to a practical requirement.

In addition, each functional unit in each implementation of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each implementation of the disclosure. The above mentioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a transmit power, comprising:
estimating, by a User Equipment (UE), a downlink pathloss of at least one of a serving cell or one or more neighbor cells according to a first Synchronization Signal/PBCH Block (SSB) of the serving cell when a downlink RS resource index for estimating the downlink pathloss is not provided; wherein the first SSB is an SSB that the UE uses to obtain a Master Information Block (MIB);
determining, by the UE, the transmit power of a Sounding Reference Signal (SRS) based on the downlink pathloss of at least one of the serving cell or the one or more neighbor cells, wherein the SRS transmission is for positioning purpose;
wherein determining, by the UE, the transmit power of the SRS based on the downlink pathloss of at least one of the serving cell or the one or more neighbor cells comprises:
when a pathloss RS for the serving cell is not configured and a pathloss RS for the one or more neighbor cells is configured, determining, by the UE, the transmit power of the SRS based on a transmit power which is determined based on the downlink pathloss of the one or more neighbor cells and the downlink pathloss of the serving cell, the downlink pathloss of the one or more neighbor cells being determined based on the pathloss RS configured for the one or more neighbor cells, and the downlink pathloss of the serving cell being determined based on the first SSB of the serving cell;
wherein the method further comprises:
receiving, by the UE, first configuration information from a network device, the first configuration information being used for determining configuration information of one SRS resource set for positioning purpose, the SRS resource set including one or more SRS resources for positioning purpose; and
when the downlink RS resource index for estimating the downlink pathloss of the serving cell is not configured and the downlink RS resource index for estimating the downlink pathloss of the one or more neighbor cells is configured in the first configuration information, determining, by the UE, the transmit power $P_{SRS,positiong}$ of the SRS in an SRS resource of the SRS resource set as:

$$P_{SRS,positiong} = \min\left\{\max\left\{\begin{array}{l}P_{CMAX}\\P_{0,s} + 10\log_{10}(2^\mu \cdot M_{SRS}) + \alpha_s \cdot PL_s + h\\P_{0,n} + 10\log_{10}(2^\mu \cdot M_{SRS}) + \alpha_n \cdot \max\{PL_{n1}, PL_{n2}\}\end{array}\right\}\right\}$$

wherein $P_{CMAX}$ is a UE configured maximum output power; $P_{0,s}$ is a target receive power level configured for the serving cell; $M_{SRS}$ is an SRS bandwidth expressed in number of resource blocks; $\mu$ is an SCS; $PL_s$ is the downlink pathloss of the serving cell, $PL_s$ being determined based on an RS resource obtained from the first SSB of the serving cell; $\alpha_s$ is a downlink pathloss compensation factor configured for the serving cell; h is a close-loop power control parameter; $P_{0,n}$ is a target receive power level configured for the one or more neighbor cells; $PL_{n1}$ is a first downlink pathloss of the one or more neighbor cells, $PL_{n1}$ being determined based on a first RS resource index for estimating the downlink pathloss of the one or more neighbor cells; $PL_{n2}$ is a second downlink pathloss of the one or more neighbor cells, $PL_{n2}$ being determined based on a second RS resource index for estimating the downlink pathloss of the one or more neighbor cells; and $\alpha_n$ is a downlink pathloss compensation factor configured for the one or more neighbor cells.

2. An apparatus for determining a transmit power, applied in User Equipment (UE), the apparatus comprising: a processor and a transceiver, wherein the processor is configured to:
estimate a downlink pathloss of at least one of a serving cell or one or more neighbor cells according to a first Synchronization Signal/PBCH Block (SSB) of the serving cell when a downlink RS resource index for estimating the downlink pathloss is not provided; wherein the first SSB is an SSB that the UE uses to obtain a Master Information Block (MIB); and
determine, when a pathloss RS for the serving cell is not configured and a pathloss RS for the one or more neighbor cells is configured, the transmit power of a Sounding Reference Signal (SRS) based on a transmit power which is determined based on the downlink pathloss of the one or more neighbor cells and the downlink pathloss of the serving cell, the downlink pathloss of the one or more neighbor cells being determined based on the pathloss RS configured for the one or more neighbor cells, and the downlink pathloss of the serving cell being determined based on the first SSB of the serving cell, wherein the SRS transmission is for positioning purpose;
wherein the transceiver is further configured to:
receive first configuration information from a network device, the first configuration information being used for determining configuration information of one SRS resource set for positioning purpose, the SRS resource set including one or more SRS resources for positioning purpose; and wherein the processor is further configured to:

when the downlink RS resource index for estimating the downlink pathloss of the serving cell is not configured and the downlink RS resource index for estimating the downlink pathloss of the one or more neighbor cells is configured in the first configuration information, determine the transmit power $P_{SRS,positioning}$ of the SRS in an SRS resource of the SRS resource set as:

$$P_{SRS,positioning} = \min\left\{\begin{array}{c} P_{CMAX} \\ \max\left\{\begin{array}{c} P_{0,s} + 10\ \log_{10}(2^{\mu} \cdot M_{SRS}) + \alpha_s \cdot PL_s + h \\ P_{0,n} + 10\ \log_{10}(2^{\mu} \cdot M_{SRS}) + \alpha_n \cdot \max\{PL_{n1}, PL_{n2}\} \end{array}\right\} \end{array}\right\}$$

wherein $P_{CMAX}$ is a UE configured maximum output power; $P_{0,s}$ is a target receive power level configured for the serving cell; $M_{SRS}$ is an SRS bandwidth expressed in number of resource blocks; $\mu$ is an SCS; $PL_s$ is the downlink pathloss of the serving cell, $PL_s$ being determined based on an RS resource obtained from the first SSB of the serving cell; $\alpha_s$ is a downlink pathloss compensation factor configured for the serving cell; h is a close-loop power control parameter; $P_{0,n}$ is a target receive power level configured for the one or more neighbor cells; $PL_{n1}$ is a first downlink pathloss of the one or more neighbor cells, $PL_{n1}$ being determined based on a first RS resource index for estimating the downlink pathloss of the one or more neighbor cells; $PL_{n2}$ is a second downlink pathloss of the one or more neighbor cells, $PL_{n2}$ being determined based on a second RS resource index for estimating the downlink pathloss of the one or more neighbor cells; and $\alpha_n$ is a downlink pathloss compensation factor configured for the one or more neighbor cells.

3. A method for determining a transmit power, comprising:

estimating, by a User Equipment (UE), a downlink pathloss of at least one of a serving cell or one or more neighbor cells according to a first Synchronization Signal/PBCH Block (SSB) of the serving cell when a downlink RS resource index for estimating the downlink pathloss is not provided; wherein the first SSB is an SSB that the UE uses to obtain a Master Information Block (MIB);

determining, by the UE, the transmit power of a Sounding Reference Signal (SRS) based on the downlink pathloss of at least one of the serving cell or the one or more neighbor cells, wherein the SRS transmission is for positioning purpose;

wherein determining, by the UE, the transmit power of the SRS based on the downlink pathloss of at least one of the serving cell or the one or more neighbor cells comprises:

when a pathloss RS for the one or more neighbor cells is not configured and a downlink Positioning Reference Signal (PRS) resource set for at least one neighbor cell is configured, determining, by the UE, the transmit power of the SRS based on the downlink pathloss of the serving cell and the downlink pathloss of the one or more neighbor cells, the downlink pathloss of the one or more neighbor cells being determined based on a first downlink PRS resource of a first neighbor cell, and the downlink pathloss of the serving cell being determined based on the first SSB of the serving cell;

wherein the method further comprises:

receiving, by the UE, first configuration information and second configuration information from a network device, wherein the first configuration information is used for determining configuration information of an SRS resource set for positioning purpose, the SRS resource set including one or more SRS resources for positioning purpose; and the second configuration information is used for determining configuration information of a downlink PRS resource set of at least one neighbor cell, the downlink PRS resource set including one or more PRS resources for positioning purpose; and when the downlink RS resource index for estimating the downlink pathloss of the serving cell is not configured and the downlink RS resource index for estimating the downlink pathloss of the one or more neighbor cells is not configured in the first configuration information, determining, by the UE, the transmit power $P_{SRS,positioning}$ of the SRS in an SRS resource of the SRS resource set as:

$$P_{SRS,positioning} = \min\left\{\begin{array}{c} P_{CMAX} \\ \max\left\{\begin{array}{c} P_{0,s} + 10\ \log_{10}(2^{\mu} \cdot M_{SRS}) + \alpha_s \cdot PL_s + h \\ P_{0,n} + 10\log_{10}(2^{\mu} \cdot M_{SRS}) + \alpha_n \cdot PL_n \end{array}\right\} \end{array}\right\}$$

where $P_{CMAX}$ is a UE configured maximum output power; $P_{0,s}$ is a target receive power level configured for the serving cell; $M_{SRS}$ is an SRS bandwidth expressed in a number of resource blocks; $\mu$ is an SCS; $PL_s$ is the downlink pathloss of the serving cell, $PL_s$ being determined based on an RS resource obtained from the first SSB of the serving cell; $\alpha_s$ is a downlink pathloss compensation factor configured for the serving cell; h is a close-loop power control parameter; $P_{0,n}$ is a target receive power level configured for the one or more neighbor cells; $PL_n$ is the downlink pathloss of the one or more neighbor cells, $PL_n$ being determined based on a first downlink PRS resource of a first neighbor cell; and $\alpha_n$ is a downlink pathloss compensation factor configured for the one or more neighbor cells.

* * * * *